United States Patent [19]

Henning et al.

[11] Patent Number: 4,921,842
[45] Date of Patent: May 1, 1990

[54] PROCESS FOR THE PRODUCTION OF AQUEOUS POLYURETHANE DISPERSIONS

[75] Inventors: Wolfgang Henning, Kuerten; Harald Petersen, Dormagen; Gerhard Moormann, Rommerskirchen, all of Fed. Rep. of Germany

[73] Assignee: Bayer Aktiengessellschaft, Leverkusen, Fed. Rep. of Germany

[21] Appl. No.: 230,278

[22] Filed: Aug. 9, 1988

[30] Foreign Application Priority Data

Aug. 15, 1987 [DE] Fed. Rep. of Germany ....... 3727252

[51] Int. Cl.$^5$ ............................................. C08L 75/04
[52] U.S. Cl. ................................... 524/839; 524/802; 524/840
[58] Field of Search .................... 524/839, 802, 840

[56] References Cited

U.S. PATENT DOCUMENTS

| | | | |
|---|---|---|---|
| 3,036,998 | 5/1962 | Radner | 260/77.5 |
| 3,388,087 | 6/1968 | Dieterich et al. | 260/29.2 |
| 3,479,310 | 11/1969 | Dieterich et al. | 260/29.2 |
| 3,480,592 | 11/1969 | Dieterich et al. | 260/77.5 |
| 3,686,108 | 8/1972 | Reiff et al. | 260/29.2 |
| 3,756,992 | 9/1973 | Dieterich | 260/77.5 |
| 4,086,193 | 4/1978 | Reischl | 260/2.5 |
| 4,108,814 | 8/1978 | Reiff et al. | 260/29.2 |
| 4,306,998 | 12/1981 | Wenzel et al. | 260/13 |

FOREIGN PATENT DOCUMENTS

| | | |
|---|---|---|
| 880485 | 6/1953 | Fed. Rep. of Germany . |
| 1044404 | 11/1958 | Fed. Rep. of Germany . |
| 2427274 | 1/1976 | Fed. Rep. of Germany . |
| 3603996 | 8/1987 | Fed. Rep. of Germany . |
| 1058339 | 2/1967 | United Kingdom . |
| 1148244 | 4/1969 | United Kingdom . |
| 1336050 | 11/1973 | United Kingdom . |
| 1414930 | 11/1975 | United Kingdom . |
| 1428907 | 3/1976 | United Kingdom . |
| 1432112 | 4/1976 | United Kingdom . |

OTHER PUBLICATIONS

Angew, Chemie 82, 53 (1970), English Version, p. 40.
Angew, Makromol, Chem. 26, 85 et al., 1972.

Primary Examiner—Maurice J. Welsh
Attorney, Agent, or Firm—Gene Harsh; Joseph C. Gil; Thomas W. Roy

[57] ABSTRACT

The present invention relates to a process for the continuous production of aqueous polyurethane dispersions, i.e. dispersions or suspensions both of pure polyurethanes and of polyurethane ureas, by mixing a product, which has been obtained by reaction of polyisocyanates with compounds having a molecular weight of 400 to about 10,000 and containing at least two isocyanate-reactive groups, with water, characterized in that the mixing of the polyisocyanate reaction product with water is carried out in a co-current reactor, one of the components to be mixed or a mixture containing one of the two components to be mixed being compressed to an initial pressure of from about 20 to 500 bar and expanded through a coaxially arranged nozzle into the short residence time mixing tube where it is mixed with the other component or with a mixture containing the other component.

18 Claims, 1 Drawing Sheet

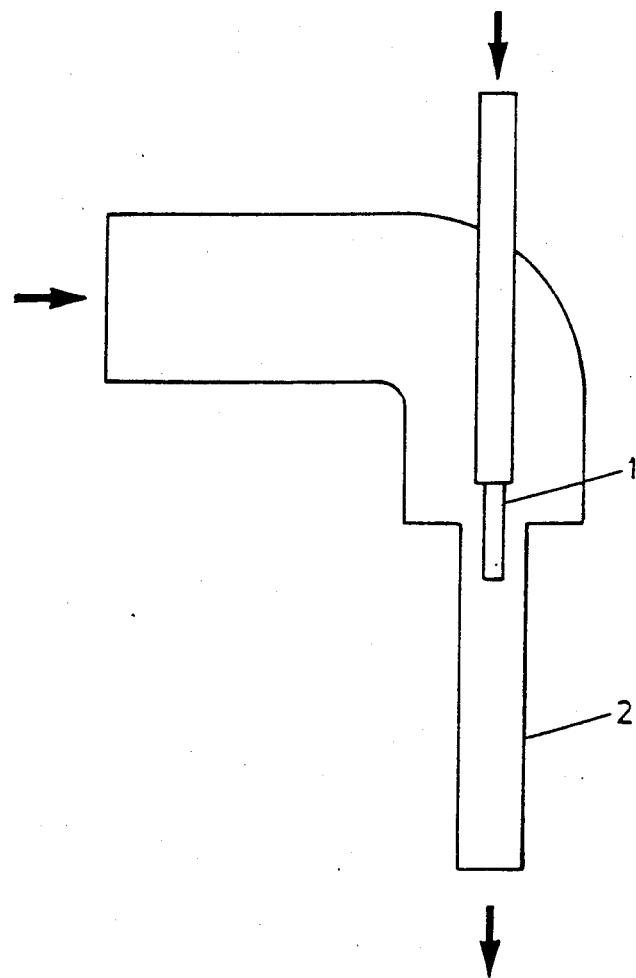

PROCESS FOR THE PRODUCTION OF AQUEOUS POLYURETHANE DISPERSIONS

BACKGROUND OF THE INVENTION

1. Field of the Invention

This invention relates to a process for the production of aqueous polyurethane dispersions using special dispersion units which are described in detail hereinafter.

2. Description of the Prior Art

The production of aqueous polyurethane dispersions, i.e. aqueous dispersions or suspensions both of pure polyurethanes and of polyurethane ureas, is known and described, for example, in the following literature: DE-PS No. 880,485, DE-AS No. 1,044,404, U.S. Pat. No. 3,036,998, DE-PS No. 1,178,586, DE-PS No. 1,184,946, DE-AS No. 1,237,306, DE-AS No. 1,495,745, DE-OS No. 1,595,602, DE-OS No. 1,770,068, DE-OS No. 2,019,324, DE-OS No. 2,035,732, DE-OS No. 2,446,440, DE-OS No. 2,345,256, DE-OS No. 2,427,274, U.S. Pat. No. 3,479,310, Angewandte Chemie 82, 53 (1970) and Angew. Makromol. Chem. 26, 85 et seq. (1972).

It is known that the disperse phase is formed in a batch process in stirred vessels comprising a stirrer and, optionally, baffles.

Continuous production processes are also known, using mixing reactors of the type described in DE-OS No. 2,260,870 or impeller homogenizers of the type described in DE-OS No. 2,311,635.

However, known apparatus for the production of dispersions or suspensions, particularly those based on polyurethanes, are attended by the disadvantage that the starting components are mixed in mechanically operated units which only have low specific power densities, are highly trouble-prone and are subjected to heavy wear. The production of film-forming dispersions is particularly difficult because deposits and, hence, blockages readily occur in zones of low turbulence.

More suitable mixing units of the type described in DE-OS No. 2,344,135 are based on the principle of countercurrent injection nozzles. In their case, a liquid isocyanate-terminated prepolymer or a corresponding prepolymer dissolved in an organic solvent is mixed with water, optionally using emulsifiers or other suitable auxiliaries, in countercurrent injection nozzles. A chain-extending agent is optionally added before, during or after mixing. The advantage of this process is that it eliminates the need to use mechanically operated mixing units and provides high mixing power.

As can be seen from the examples of DE-OS No. 2,344,135, both the prepolymer and the aqueous solution are brought to pressures of up to 200 bar before entering the mixing chamber. This is a disadvantage, particularly in the dosing of relatively high viscosity reactive prepolymers, because delivery by means of forced-delivery pumps against pressures of 20 to 200 bar causes problems and has been shown by experience not to be dependable. To avoid blockages in the prepolymer nozzle and at the entrance to the countercurrent mixing chamber, expensive filters have to be installed in the feed pipe leading to the prepolymer nozzle. As these filters become covered, dosing fluctuations inevitably occur because of the changing pressure conditions, leading to unacceptable changes in the composition of the product.

Another disadvantage of the procedure according to DE-OS No. 2,344,135 is that when a highly viscous prepolymer is used, a high system pressure is required due to pressure losses in the prepolymer nozzle: however, only a small portion of this pressure is converted into flow and mixing energy.

In addition, in the countercurrent injection nozzles described in DE-OS No. 2,344,135, it is not possible to rule out caking in zones of low turbulence, particularly when film-forming dispersions are prepared.

Accordingly, an object of the present invention is to provide a process which does not have any of the disadvantages mentioned above. This object may be achieved by the invention described in detail hereinafter.

SUMMARY OF THE INVENTION

The present invention relates to a process for the continuous production of aqueous polyurethane dispersions, i.e. dispersions or suspensions both of pure polyurethanes and of polyurethane ureas, by mixing a product, which has been obtained by reaction of polyisocyanates with compounds having a molecular weight of 400 to about 10,000 and containing at least two isocyanate-reactive groups, with water, characterized in that the mixing of the polyisocyanate reaction product with water is carried out in a co-current reactor, one of the components to be mixed or a mixture containing one of the two components to be mixed being compressed to an initial pressure of from about 20 to 500 bar and expanded through a coaxially arranged nozzle into the short residence time mixing tube where it is mixed with the other component or with a mixture containing the other component.

BRIEF DESCRIPTION OF THE DRAWINGS

The FIGURE represents an embodiment of the mixer used in accordance with the process of the present invention.

DETAILED DESCRIPTION OF THE INVENTION

The invention combines several advantages. The mixing with water is carried out without the aid of moving parts which provides for interference-free, low-wear production. By virtue of the coaxial arrangement of the nozzle 1 and the short residence time mixing tube 2, the pressure of only one of the components to be mixed has to be increased to about 20 to 500 bar to apply the necessary mixing energy. The above-described problems regarding the dosing of highly viscous prepolymers against pressure are overcome. Another effect of the coaxial arrangement of the nozzle and the short residence time mixing tube is that the short residence time mixing tube is self-cleaning. Because the short residence time mixing tube is self-cleaning, the residence-time remains constant and, thus, the reaction conditions and dispersion product remain constant, even in long-term operation.

A hydrophilic reaction product is preferably used in the process according to the invention. It is possible, as can also be seen from the literature references cited above, to use a variety of starting products (polyisocyanates or compounds having a molecular weight of 400 to about 10,000 and containing at least two isocyanate-reactive groups) and additives as synthesis components in the production of the polyisocyanate reaction product used in the process according to the invention, which may also contain a proportion of unreacted isocyanate groups. The following are mentioned as examples of such starting products and additives: monofunctional isocyanates; monofunctional isocyanate-reactive components; starting products or additives containing ionic groups (preferably

—COO⁻ or —SO₃⁻ groups) or potential ionic groups (the potential ionic groups being completely or partly converted into ionic groups before mixing with water) in an amount sufficient to provide a content of ionic product, based on solids; starting products or additives containing ethylene oxide units, —CH₂—CH₂—O—, the content of these units preferably being ≦25% by weight, based on solids: chain-extending agents having a molecular weight of 18 to 399 and preferably containing two isocyanate-reactive groups; catalysts for the isocyanate polyaddition reaction; emulsifiers laminators; neutralizing agents for potential ionic groups; and solvents.

The water added as a component of the mixture may also contain additives such as chain-extending agents which react with isocyanate groups more quickly than water and/or neutralizing agents for potential ionic groups.

The following are examples of the starting products and additives mentioned above.

Suitable polyisocyanates (a) include (a1) diisocyanates corresponding to the formula Q(NCO)₂, wherein Q is an aliphatic hydrocarbon radical containing from 4 to 12 carbon atoms, a cycloaliphatic hydrocarbon radical containing from 6 to 15 carbon atoms, an aromatic hydrocarbon radical containing from 6 to 15 carbon atoms or an araliphatic hydrocarbon radical containing from 7 to 15 carbon atoms. Examples of preferred diisocyanates include tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 4,4'-diisocyanato-2,2-diphenylpropane, p-xylylene diisocyanate, α,α,α',α'-tetramethyl-m- or p-xylylene diisocyanate, and mixtures of these compounds.

Further examples of synthesis components (a) suitable for use in accordance with the present invention include (a2) the prepolymers containing NCO groups known from polyurethane chemistry and obtained by the reaction of monomeric diisocyanates of the type mentioned by way of example in (a1) with organic polyhydroxyl compounds of the type mentioned by way of example in (b1) below at an NCO:OH equivalent ratio of about 1.2:1 to 10:1, preferably about 1.5:1 to 2.5:1. It can be seen from the equivalent ratio that, in the context of the present invention, "NCO prepolymers" also include the so-called "semiprepolymers," i.e. mixtures of excess unreacted monomeric diisocyanates with NCO prepolymers.

Other synthesis components (a) include (a3) hydrophilically modified polyisocyanates such as diisocyanates containing lateral polyether chains with incorporated ethylene oxide units according to U.S. Pat. No. 3,920,598 or sulfonated diisocyanates of the DE-OS No. 2,359,619; however, the hydrophilic groups are preferably incorporated through the synthesis component (b) described in detail hereinafter.

Basically, it is also possible to use the synthesis components (a1) to (a3) in combination with low molecular weight polyisocyanates of higher functionality such as the reaction product of 3 moles of 2,4-diisocyanatotoluene with 1 mole of trimethylolpropane and/or in combination with monofunctional isocyanates such as phenyl isocyanate, hexyl isocyanate or n-dodecyl isocyanate. It is also possible in principle to use monofunctional isocyanates containing polyether chains with incorporated ethylene oxide groups of the type described, for example, in U.S. Pat. Nos. 3,920,598 and 4,237,264, both of which are herein incorporated by reference in their entireties.

However, when monofunctional isocyanates such as these are used, premature chain termination generally has to be prevented, particularly in the production of high molecular weight polyurethanes, by the simultaneous use of synthesis components having a functionality of greater than two. It is preferred to use difunctional isocyanates of the type mentioned by way of example above as synthesis components (a).

Suitable synthesis components (b) include (b1) the polyhydroxypolyesters, polycarbonates or polyethers known from polyurethane chemistry and having a molecular weight of 400 to about 10,000, preferably 400 to about 4000. Preferably, these polyhydroxy compounds are difunctional compounds. Suitable polyester polyols may be obtained by the reaction of polybasic acids, preferably dibasic acids (such as adipic acid, phthalic acid, tetrahydrophthalic acid and/or hexahydrophthalic acid) with excess quantities of polyhydric alcohols, preferably dihydric alcohols, of the type mentioned by way of example in (b2) below. Suitable polyethers may be obtained by the alkoxylation of suitable starter molecules (such as water, ammonia, aniline or the polyhydric alcohols mentioned by way of example in (b2) below) with alkylene oxides such as ethylene oxide and/or propylene oxide.

Other suitable synthesis components (b) include (b2) polyhydric alcohols, preferably dihydric alcohols, having a molecular weight of 62 to 399, especially the alkane polyols (such as ethylene glycol, propylene glycol, hexamethylenediol, glycerol, trimethylolpropane or trimethylolethane) and also the low molecular weight alcohols containing ether groups (such as diethylene glycol, triethylene glycol, dipropylene glycol or tripropylene glycol). Mixtures of these alcohols may also be used.

Other suitable synthesis components (b) include (b3) compounds containing at least two aminic or hydrazinic amino groups and having a molecular weight of 32 to 399 such as ethylenediamine, hexamethylenediamine, isophoronediamine, 2,4-diaminotoluene, 4,4'-diaminodiphenylmethane, 4,4'-diaminodicyclohexylmethane, diethylenetriamine, triethylenetetramine, hydrazine or hydrazine hydrate. Synthesis components such as these may also be used in blocked form, i.e. in particular in the form of the corresponding ketimines or ketazines (reaction products with ketones such as acetone, methylethylketone or methylisobutylketone). When blocked chain-extending agents such as these are used, the isocyanate-reactive groups are released under the hydrolytic influence of the dispersion water.

Other compounds suitable as synthesis components (b) include (b4) ionic synthesis components or potential ionic synthesis components containing at least one tertiary or quaternary ammonium group or groups convertible into such groups or carboxyl, carboxylate, sulfonic acid and/or sulfonate groups, in addition to at least two isocyanate-reactive groups. The at least partial conversion of the groups convertible into salt groups takes place before or during the mixing with water. The anionic synthesis components include the aliphatic diols containing sulfonate groups according to DE-OS No. 2,446,440 (U.S. Pat. No. 4,108,814) or DE-OS No. 2,437,218, diols and/or diamines containing sulfonate or carboxylate groups or sulfonic or carboxylic acid groups convertible into sulfonate or carboxylate groups of the type described in CA-PS No. 928,323, such as the sodium salt of N-(2-aminoethyl)-2-aminoethane sulfonic acid. Other suitable anionic groups are disclosed in U.S. Pat. No. 4,408,008, herein incorporated by reference in its entirety.

The synthesis components containing (potential) cationic hydrophilic groups include amino alcohols containing tertiary amine nitrogen of which the tertiary nitrogen atoms may be converted at least partly into ternary or quaternary ammonium groups by neutralization or quaternization on completion of the isocyanate polyaddition reaction (such as N-methyl diethanolamine, N-butyl diethanolamine, N-methyl diisopropanolamine, N-ethyl diethanolamine, N-ethyl diisopropanolamine or N,N'-bis-(2-hydroxyethyl)-perhydropyrazine) and also corresponding monohydric alcohols (such as N,N-dimethylethanolamine, 2-(2-dimethylaminoethoxy)-ethanol, N,N-diethylethanolamine, 2-(2-diethylaminoethoxy)ethanol, N,N-di-n-butylaminoethanol, N-(3-hydroxypropyl)-dimethylamine, N-(2-hydroxypropyl)dimethylamine, 1-diethylamino-2-propanol or 1,3-bis-(dimethylamino)-2-propanol.

The synthesis components also include analogous synthesis components containing at least one tertiary amino group, i.e. a potential ternary or quaternary ammonium group, which contain at least one primary or secondary aminic or hydrazinic amino group instead of hydroxyl group(s) (such as N-methyl bis-(3-aminopropyl)amine, N-methyl-bis-(2-aminoethyl)-amine or N,N',N''-trimethyl diethylenetriamine) and also monofunctional compounds (such as 1-amino-2-diethylaminoethane, 1-amino-3 dimethylaminopropane, 1-amino-3-diethylaminopropane or N,N-dimethyl hydrazine.

In the production of the product used in accordance with the invention, the ternary or quaternary ammonium groups are preferably incorporated using synthesis components containing tertiary amino groups with subsequent conversion of the amino groups into the corresponding ammonium groups by neutralization with inorganic or organic acids (such as hydrochloric acid, acetic acid, fumaric acid, maleic acid, lactic acid, tartaric acid, oxalic acid, N-methyl-N-(methylaminocarbonyl)-aminomethane sulfonic acid or phosphoric acid) or by quaternization with suitable quaternizing agents (such as methyl chloride, methyl iodide, dimethyl sulfate, benzyl chloride, chloroacetic acid ethyl ester or bromoacetamide). Other examples of suitable neutralizing or quaternizing agents can be found, for example, in DE-OS No. 2,827,156 (U.S. Pat. No. 4,331,717, herein incorporated by reference in its entirety). The neutralization or quaternization of the synthesis components containing tertiary nitrogen may also be carried out before or during the isocyanate polyaddition reaction. Ternary or quaternary ammonium groups may also be incorporated in the polyisocyanate polyaddition products through polyether polyols containing tertiary amino groups of the type used as synthesis component (b1) with subsequent neutralization or quaternization of the tertiary amino groups.

The quantity of ionic or potential ionic synthesis components and the degree of neutralization or the degree of quaternization are preferably selected so that the end products according to the invention contain about 1 to 200, preferably about 2 to 150 and more preferably about 5 to 100 milliequivalents of ionic groups (especially

—COO$^\ominus$ or —SO$_3^\ominus$ groups) per 100 g of solids. In addition, it is also possible to use anionic and cationic hydrophilic synthesis components together, as described for example in DE-OS No. 2,721,985.

Other suitable synthesis components (b) include (b5) monohydric or dihydric alcohols containing ethylene oxide units incorporated in polyether chains. These alcohols include compounds corresponding to the following general formula

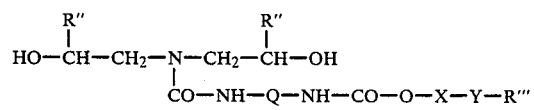

wherein

Q is a difunctional residue of the type obtained by removal of the isocyanate groups from a diisocyanate corresponding to the formula Q(NCO)$_2$ as mentioned above in (a1), R'' represents hydrogen or a monofunctional C$_1$–C$_8$ hydrocarbon radical, preferably hydrogen or a methyl group, R''' represents a monofunctional C$_1$–C$_4$ hydrocarbon radical, preferably an unsubstituted C$_1$–C$_4$ alkyl radical, X represents a residue of the type obtained by removing the terminal oxygen atom from a polyalkylene oxide chain containing about 5 to 90, preferably about 20 to 70 alkylene oxide units, wherein at least about 40%, preferably at least about 65% of the alkylene oxide units are ethylene oxide units and the remaining units are preferably propylene oxide, butylene oxide or styrene oxide units, most preferably propylene oxide units, and Y represents oxygen or —NR$^{IV}$—, wherein R$^{IV}$ corresponds to R'''.

The compounds corresponding to the formula shown in the preceding paragraph may be produced in accordance with U.S. Pat. Nos. 3,905,929 or 4,190,566, both of which are herein incorporated by reference in their entireties.

Other preferred hydrophilic synthesis components (b5) include compounds corresponding to the following general formula

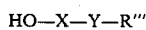

in which

X, Y and R''' are as already defined.

When monofunctional, nonionically hydrophilic polyethers of this type are used, it can often be of advantage to prevent premature chain termination by using synthesis components having a functionality of more than 2. The monofunctional polyethers corresponding to the above general formula are produced by known methods as described, for example, in U.S. Pat. Nos. 3,905,929, 4,190,566 or 4,237,264.

The quantity of the synthesis components containing nonionic hydrophilic groups is selected so that the end products according to the invention preferably contain $\leqq 25\%$ by weight, based on solids, of ethylene oxide units present in a lateral or terminal polyether chains.

Other suitable synthesis components (b) include (b6) amino alcohols having a molecular weight of 61 to about 300, such as ethanolamine, propanolamine, diethanolamine or dipropanolamine.

A final synthesis component is (b7) water which may perform the dual function of the continuous phase of the dispersions according to the invention and also of a chain-extending agent.

Synthesis components (b), which have a functionality of 2 in the isocyanate addition reaction, are preferably used in the production of the reaction products according to the invention. As already mentioned, however, it is also possible to use monofunctional synthesis components (b), especially those of the type mentioned in (b5) or, when branching of the molecule is required, to use synthesis components (b) which are more than difunctional.

Synthesis components (c) may also be used in the production of the reaction products according to the invention:

(c1) solvents having a boiling point below 100° C. which may readily be removed from the aqueous phase by distillation and which do not contain any isocyanate-reactive groups. Solvents such as these include benzene, ethylacetate, acetone, methylethylketone, diethyl ether, tetrahydrofuran, methyl acetate, acetonitrile, chloroform, methylene chloride, carbon tetrachloride, 1,2-dichloroethane, trichloroethane, tetrachloroethylene. Solvents which may be continuously added to the prepolymer include (c2) the above-mentioned solvents which may contain up to about 50% by weight of water. In addition to these solvents, however, it is also possible to use solvents containing groups which are only mildly reactive with isocyanate groups, for example alcohols such as methanol, ethanol, propanol and isopropanol. The solvents mentioned may also be used in the form of mixtures.

The use of more reactive solvents (such as glycols) should only be considered when fully reacted polyisocyanate addition products are to be dissolved.

Various additives and auxiliaries (d) may be used in the production of the reaction products according to the present invention including (d1) neutralizing agents for carboxyl groups incorporated in the polyurethanes. In principle, any inorganic or organic bases may be used, although it is preferred to use tertiary amines (such as trimethylamine, triethylamine, N-methylmorpholine, N-methyl diethanolamine or N,N-dimethyl ethanolamine) to neutralize the carboxyl and/or sulfonic acid groups, if any, present in the addition products.

Other optional auxiliaries and additives (d) include (d2) accelerators for the isocyanate polyaddition reaction which are known from polyurethane necessary to use such catalysts.

Other optional auxiliaries and additives (d) include (d3) emulsifiers, preferably nonionic emulsifiers, which are not chemically incorporated into the addition products of the invention. Emulsifiers such as these include ethoxylated nonylphenol; polyoxyethylene laurylether; or polyoxyethylene laurate, oleate or stearate. These additives generally contain about 8 to 50 oxyethylene units per molecule. These external emulsifiers are optionally added to the reaction products according to the invention on completion of the isocyanate addition reaction to improve their solubility or dispersibility in water. The additional oxyethylene units thus introduced into the solutions or dispersions according to the invention are not included in the calculation of the content of ethylene oxide units in the polyisocyanate addition products because this content is based solely on chemically incorporated ethylene oxide units.

Other optional auxiliaries and additives (d) include solvents having a boiling point above 100° C. which remain in the aqueous dispersion and are not removed with the solvents mentioned in (c) by distillation. Such solvents include (d4) solvents which do not contain any isocyanate-reactive groups such as diisopropyl ketone, xylene, dimethylformamide, dimethyl acetamide, dimethyl sulfoxide, methyl glycol acetate, ethyl glycol acetate, butyl acetate and N-methylpyrrolidone.

(d5) The solvents which are continuously added include the above-mentioned solvents which may optionally contain up to about 50% of water and also those containing mildly isocyanate-reactive groups such as glycols of the type mentioned in (b2). The solvents mentioned may of course also be used in the form of mixtures.

Other optional auxiliaries and additives (d) include inert fillers, pigments, dyes, plasticizers or additives which influence the rheological properties.

The dispersion unit used in the process according to the invention is a co-current reactor of the type shown by way of example in FIG. 1. The co-current reactor contains a mixing tube 2, preferably without any fittings, into which the component of relatively high viscosity is preferably introduced at low rates, and a coaxially arranged nozzle 1 through which the low viscosity component is preferably introduced at velocities of about 50 to 200 m/second and sprayed into the mixing tube by system pressures of about 20 to 500 bar. The diameter ratio of nozzle to mixing tube is preferably about 0.01:1 to 0.5:1. The diameter-to-length ratio of the mixing tube is preferably 2:1 to 0.01:1. The length of the mixing tube is defined as the distance between the exit of the nozzle 1 and the end of the mixing tube.

The selected arrangement of the nozzle and the mixing tube provides for an impulse and material transfer. Power densities of up to 500 W/cm$^3$ are obtained. In the mixing tube, virtually all the kinetic energy of the sprayed component is converted into friction and mixing power. Besides the intensive mixing effect, the fact that the co-current reactor is unaffected by caking on the walls is another important feature. The high shear forces generated make the mixing tube self-cleaning.

Other mixing units may optionally be used in addition to the co-current reactor.

These other mixing units include rotor-stator systems such as the flow mixers manufactured by Ekato RMT (Schopfheim, Federal Republic of Germany), Lightnin (Neu-Isenburg, Federal Republic of Germany) and Hennecke (barbed stirrers): impeller homogenizers such as the Supraton Maschine made by Supraton Auer & Zucker OHG (Norf Federal Republic of Germany) or the Dispax-Reaktor made by Jahnke & Kunkel KG (Staufen, Federal Republic of Germany) or dispersion machines of the type described in DE-OS No. 3,319,921. The dispersion power ranges from about 0.3 to 10 kW per liter of mixer volume, depending on the type of mixer used and the viscosity of the components to be mixed.

Other suitable mixing units include static mixers such as mixers with simple fittings (for example the spiral coil in the Static Mixer made by Kenics Corp., U.S.A.), multichannel mixers (for example the AMK-Ross-ISG mixer made by Aachener Misch- und Knetmaschinen-Fabrik, Federal Republic of Germany) or so-called pack mixers (for example the static mixer made by Sulzer AG, Winterthur, Switzerland) and the BKM mixer (made by Bayer AG, Federal Republic of Germany).

In one preferred embodiment of the process according to the invention, an NCO-terminated prepolymer is generally first prepared at temperatures of about 20° to 150° C., preferably about 20° to 130° C. The prepolymer obtained may then be dissolved in a suitable solvent. Dissolution takes place discontinuously by adding the entire quantity of solvent to the entire quantity of prepolymer (a little solvent may have been added to reduce viscosity) in which case solvents of the type described in (c1) and, optionally, (d4) are used. In a by mixing the prepolymer and the solvent in one of the mixing units mentioned above. In this case the components to be mixed are introduced continuously into the mixing units by means of pumps (such as piston pumps, gear wheel pumps, centrifugal pumps, peristaltic pumps, or by pressure)-and solvents of the type mentioned in (c2) and, optionally, (d5) are used. It is of course also possible in the process according to the invention to introduce a portion of the solvent (mixture) discontinuously and a portion continuously.

When the prepolymer is processed at elevated temperature, it may be advantageous to heat the storage vessels, pump units and pipes. The solvent may even be mixed with the prepolymer at elevated temperature, optionally under pressure. The prepolymer (solution) and the liquid phase may of course also be delivered and mixed at different temperatures. According to the invention, however, the prepolymer may also be processed in the absence of solvents.

In general, the optionally dissolved prepolymer is subsequently subjected to chain extension. Chain extension may be carried out before, during or after the dispersion in water. When a dissolved prepolymer is used, the chain-extending agent is preferably added before dispersing the prepolymer in water.

In one particularly preferred embodiment of the process according to the invention, the chain-extending agent and the dissolved prepolymer are continuously reacted by mixing them in one of the mixing units mentioned above. The components to be mixed are delivered into the mixing unit by pressure or by means of pumps as previously discussed.

The time required for the chain-extending reaction is largely determined by the delivery volume and the capacity of the mixing unit, although it may be varied as required by following residence-time zones in the form of ordinary pipes or mixing vessels.

When the prepolymer is further processed in undissolved form, the chain-extending agent is generally added during or after the dispersion in water.

Compounds containing aminic or hydrazinic groups of the type mentioned in (b3) or (b4) are preferably used as chain-extending agents.

The ratio of NCO groups of the prepolymer to NCO-reactive groups of the chain-extending agent is about 0.7:1 to 1:0.2, preferably about 0.8:1 to 1:0.4.

When synthesis components containing potential hydrophilic groups are used for the preparation of the dispersions or solutions, the potential hydrophilic groups may be converted into hydrophilic groups before or during dispersion in water. When conversion precedes dispersion in water, the optionally dissolved and optionally chain-extended prepolymer and the synthesis components suitable for the conversion of the potential hydrophilic group into hydrophilic groups are continuously combined in one of the mixing units mentioned above. When the conversion is carried out during the dispersion with water, the synthesis components suitable for the conversion of the potential hydrophilic group into hydrophilic groups are added to the dispersion water.

The external emulsifiers (d3) suitable for assisting the dispersion process may also be added to the prepolymer before or during dispersion in water. In this case, the procedure described above is adopted or alternatively the external emulsifiers are directly used in the production of the prepolymer. External emulsifier are preferably used in concentrations of 0 to about 25% by weight, preferably 0 to about 10% by weight, based on solids.

The optionally dissolved and optionally chain-extended prepolymer is then continuously mixed in the co-current reactor with water to which the above-mentioned chain-extending agents have optionally been added.

The components to be mixed are delivered into the mixing unit by pressure or by means of pumps, optionally at elevated temperature and/or under pressure.

When solvents are used, the dispersed product is subsequently freed from the solvent under reduced pressure at temperatures of about 20° to 100° C., preferably about 30° to 90° C. The apparatus used for this purpose include either the usual tank evaporators or, preferably, evaporator constructions having flooded evaporator surfaces such as circulation evaporators with external heating elements, Robert's evaporators, Herbert's evaporators or long tube evaporators of the type described in Ullmanns Enzyclopadie der technischen Chemie, Vol. 2, pages 653–655. To obtain low residual solvent contents, it may be necessary to carry out the distillation in more than one stage.

In one particular embodiment of the process according to the invention, the solvent obtained after distillation, which may contain up to about 50% by weight, preferably 0 to about 30% by weight and more preferably 0 to about 20% by weight water, is directly returned to the production process by pumps or by pressure as solvent for the prepolymer. When the distillation of the solvent from the aqueous dispersion is carried out in more than one stage, it is preferred to directly reuse only those distillates which have a about 30% by weight and more preferably 0 to about 20% by weight. To obtain this water content in the solvent, it may be necessary to carry out the distillation using a distillation column.

It is of course also possible in accordance with the invention to free the solvent distillates from water in a separate step so that the water content is up to about 50% by weight, preferably 0 to about 30% by weight and more preferably 0 to about 20% by weight so that the purified distillates may be reused as solvent.

The product ultimately obtained is a stable aqueous polyurethane (urea) dispersion or solution having a solids content of up to about 60% by weight, preferably about 15 to 60% by weight and more preferably about 25 to 50% by weight. The dispersions or solutions may be further diluted in any ratio. The polyurethane dispersions obtained by the described process may also be modified with isocyanates after the dispersion or distillation, as described in DE-OS No. 2,708,442.

The dispersions may be blended with other polymer dispersions such as polyvinyl acetate, polyethylene, polystyrene, polybutadiene, polyvinyl chloride, polyacrylate and copolymer dispersions. External ionic emulsifiers may also be added.

Finally, fillers, plasticizers, pigments, carbon black and silica sols, aluminum, clay and asbestos dispersions may also be incorporated into the dispersions.

The dispersions of the polyurethanes in water are generally stable, storable and transportable and may be processed at a later stage, for example by molding. They generally dry immediately to form dimensionally stable coatings, although the end product may also be molded in the presence of crosslinking agents known per se. The polyurethanes have different properties according to the chemical composition selected and the content of urethane groups. Thus, it is possible to obtain soft tacky compositions, thermoplastic and elastomeric products differing widely in their hardness and also glass-hard duroplasts. The hydrophilicity of the products may also vary within wide limits. The elastic products may be thermoplastically processed at elevated temperature, for example at temperatures of about 100° to 180° C., providing they are not chemically crosslinked.

The end products are suitable for the coating and impregnation of woven and non-woven textiles, leather, paper, wood, metals, ceramics, stone, concrete, bitumen, hard fibers, straw, glass, porcelain, plastics of various kinds and glass fibers: for antistatic and creasefree finishing: as binders for nonwovens, adhesives, primers, laminating agents, hydrophobicizing agents, plasticizers, binders (for example for cork or wood meal), glass fibers, asbestos, paper-like materials, plastic or rubber waste and ceramic materials: as auxiliaries in fabric printing and in the paper industry: as additives for polymers; as sizing agents, for example, for glass fibers and for finishing leather.

To this end, the dispersions or pastes are preferably applied to a porous support which subsequently remains joined to the end product such as woven or non-woven textiles or fiber mats, felts or nonwovens (including those based on paper), foam sheeting or skiver, which are capable by virtue of their absorbing effect of immediately solidifying the coating. This is followed by drying at elevated temperature and, optionally, compression molding. However, drying may also be carried out on smooth porous or non-porous materials such as metals, glass, paper, cardboard, ceramic materials, steel plate, silicone rubber and aluminum foil, in which case the final sheet-form material is subsequently lifted off and used as such or applied to a substrate by bonding, flame bonding or calendering using the inverse technique. Application by the inverse technique may be carried out at any time.

The properties of the end product may be modified by using vinyl polymers or active or inactive fillers. For example, it is possible to use polyethylene, polypropylene, polyvinyl acetate and ethylene-vinyl acetate copolymers which may be (partially) hydrolyzed and/or grafted with vinyl chloride, styrene-butadiene copolymers, ethylene (graft) copolymers, polyacrylates, carbon black, silica, asbestos, talcum, kaolin, cellulose and titanium dioxide, which may be used in powder form or in the form of fibers. Depending on the desired property spectrum and the intended application for the end products, up to about 70%, based on the total solids content, of fillers such as these may be present in the end product. It is of course also possible to add dyes, pigments, plasticizers or additives which influence the rheological properties.

The products obtained by various application techniques may be dried at room temperature or at elevated temperature. The drying temperature to be selected in each individual case (which aside from the chemical composition of the material, is determined above all by the moisture content, the drying time and the layer thickness) is readily determined by a preliminary test. For a given heating time, the drying temperature.

The sheet-form materials may be coated with a finish to increase the resistance of their surface. Aqueous dispersions or solutions are again preferably used for this purpose.

Very hard polyurethanes obtained from finely divided dispersions and sols are suitable for use as stoving lacquers and, in some cases, even as air-drying lacquers. They combine high hardness and elasticity with high gloss and—when aliphatic diisocyanates are used—with high light stability and weather resistance.

EXAMPLES

EXAMPLE 1

A prepolymer was mixed with a 5.0% aqueous chain extender solution of isophorone diamine in a short residence time mixing tube of the type shown in FIG. 1 wherein the internal nozzle diameter was 0.8 mm, the diameter of the mixing tube was 1.0 cm and the length of the mixing tube was 1.0 cm. The prepolymer had an NCO content of 5.05% by weight and was prepared from hexamethylene diisocyanate, a copolyester of adipic acid, hexanediol and neopentyl glycol (ratio by weight of the diols 11:6) having an average molecular weight of 1700, a propoxylated adduct of but-2-ene-1,4-diol and $NaHSO_3$ (Mw 430; 70% in toluene) and a butanol-started polyethylene oxide-polypropylene oxide polyether (OH number 26; 78.3% by weight ethylene oxide) in amounts sufficient to provide a content of $SO_3$ groups of 1.5% by weight and a content of ethylene oxide units incorporated in a polyether chain of 1.81% by weight. The ratio of prepolymer to chain extender solution was 1:1.62. The aqueous chain extender solution was introduced into the nozzle under a system pressure of 100 bar. The discharged product was introduced into a storage vessel at 3.3 kg/minute and stirred at 50° C. until no more NCO groups could be detected.

A finely divided dispersion having a solids content of 40% by weight was obtained. The dispersion was stable to centrifuging for 15 minutes.

EXAMPLE 2

A prepolymer was mixed with water containing 150 ppm of permethyl diethylene triamine in a short residence time mixing tube of the type shown in FIG. 1, wherein the internal nozzle diameter was 0.8 mm, the diameter of the mixing tube was 0.4 cm and the length of the mixing tube was 15.0 cm. The prepolymer had an NCO content of 4.11% by weight and was prepared from hexamethylene diisocyanate, a polyester of adipic acid and butanediol having an average molecular weight of 2250, a propoxylated adduct of but-2-ene-1,4-diol and NaHSO$_3$ (Mw 430: 70% in toluene) and a butanol-started polyethylene oxide-polypropylene oxide polyether (OH number 26: 78.3% by weight ethylene oxide) in amounts to provide a content of SO$_3$ groups of 0.63% by weight and a content of ethylene oxide groups incorporated in a polyether chain of 6.74% by weight. The ratio of prepolymer to water was 1:1.5. The water was introduced into the nozzle under a system pressure of 250 bar. The discharged product was introduced into a storage vessel at 3.2 kg/minute and stirred at 50° C. until no NCO groups could be detected.

A finely divided dispersion having a solids content of 40% by weight was obtained. The dispersion was stable to centrifuging for 15 minutes.

EXAMPLE 3

A prepolymer was mixed with water containing 100 ppm of permethyl diethylene triamine at 85° C. in a short residence time mixing tube of the type shown in FIG. 1, wherein the internal nozzle diameter was 0.7 mm, the diameter of the mixing tube was 0.4 cm and the length of the mixing tube was 15.0 cm. The prepolymer had an NCO content of 4.58% by weight and was prepared from hexamethylene diisocyanate, a copolyester of adipic acid, hexanediol and neopentyl glycol (ratio by weight of the diols 11:6) having an average molecular weight of 1700, a propoxylated adduct of but-2-ene-1,4-diol and NaHSO$_3$ (Mw 430: 70% in toluene) and a butanol-started polyethylene oxide-polypropylene oxide polyether (OH number 26: 78.3% by weight ethylene oxide) in amounts to provide a content of SO$_3$ groups of 1.5% by weight and a content of ethylene oxide units incorporated in a polyether chain of 1.1% by weight. The ratio of prepolymer to water was 1:1.5. The water was introduced into the nozzle under a system pressure of 250 bar. The discharged product was introduced into a storage vessel at 3.2 kg/minute and stirred at 50° C. until no more NCO groups could be detected.

A finely divided dispersion having a solids content of 40% by weight was obtained. The dispersion was stable to centrifuging for 15 minutes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of an aqueous polyurethane dispersion from
   (a) a first stream comprising a polyisocyanate reaction product prepared by the reaction of a polyisocyanate with a compound having a molecular weight of 400 to about 10,000 and containing at least two isocyanate-reactive groups and
   (b) a second stream comprising water which comprises
   (c) compressing one of the two streams to a pressure of about 20 to 500 bar and expanding said stream through a nozzle which is coaxially arranged in a short residence time mixing tube,
   (d) introducing the other component directly into the short residence time mixing tube and
   (e) mixing the two streams in the short residence time mixing tube.

2. The process of claim 1, wherein the ratio of the internal nozzle diameter of said nozzle to the internal diameter of the short residence time mixing tube is about 0.01:1 to 0.5:1 and the ratio of the internal diameter to the length of the short residence time mixing tube is about 2:1 to 0.01:1.

3. The process of claim 1, wherein said polyisocyanate reaction product is a hydrophilic reaction product.

4. The process of claim 1, wherein said polyisocyanate reaction product contains ionic groups or potential ionic groups in an amount sufficient to provide an amount of 1 to 200 milliequivalents of ionic groups per 100 g of solids.

5. The process of claim 4, wherein said ionic groups comprise a member selected from the group consisting of

—COO$^-$ or —SO$_3^-$ groups.

6. The process of claim 1, wherein said polyisocyanate reaction product contains ethylene oxide units in terminal or lateral chains in an amount sufficient to provide a positive amount of $\leq 25\%$ by weight of ethylene oxide units, based on solids.

7. The process of claim 1, wherein said second stream comprises chain extending agents having a molecular weight of 18 to 399 and containing two isocyanate-reactive groups.

8. The process of claim 1, wherein said polyisocyanate reaction product is dissolved in an organic solvent.

9. The process of claim 4, wherein potential ionic groups are present and said second stream contains a neutralizing agent for said potential ionic groups.

10. The process of claim 7, wherein the isocyanate-reactive groups of said chain extending agent are more reactive with isocyanate groups in water.

11. A process for the continuous production of an aqueous polyurethane dispersion from
    (a) a first stream comprising a polyisocyanate reaction product prepared by the reaction of a polyisocyanate with a compound having a molecular weight of 400 to about 10,000 and containing at least two isocyanate-reactive groups and a compound containing at least two isocyanate reactive groups and ionic or potential ionic groups,
    (b) a second stream comprising water which comprises
    (c) compressing one of the two streams to a pressure of about 20 to 500 bar and expanding said stream through a nozzle which is coaxially arranged in a short residence time mixing tube wherein the ratio of the internal nozzle diameter of said nozzle to the internal diameter of the short residence time mixing tube is about 0.01:1 to 0.5:1 and the ratio of the internal diameter to the length of the short residence time mixing tube is about 2:1 to 0.01:1, (d) introducing the other component directly into the short residence time mixing tube and
(e) mixing the two streams in the short residence time mixing tube.

12. The process of claim 11, wherein said polyisocyanate reaction product contains ionic groups or potential ionic groups in an amount sufficient to provide an amount of 1 to 200 milliequivalents of ionic groups per 100 g of solids.

13. The process of claim 12, wherein said ionic groups comprise a member selected from the group consisting of

,

—COO⁻ or —SO₃⁻ groups.

14. The process of claim 11, wherein said polyisocyanate reaction product contains ethylene oxide units in terminal or lateral chains in an amount sufficient to provide a positive amount of ≦25% by weight of ethylene oxide units, based on solids.

15. The process of claim 11, wherein said second stream comprises chain extending agents having a molecular weight of 18 to 399 and containing two isocyanate-reactive groups.

16. The process of claim 11, wherein said polyisocyanate reaction product of the first stream is dissolved in an organic solvent.

17. The process of claim 11, wherein potential ionic groups are present and said second stream contains a neutralizing agent for said potential ionic groups.

18. The process of claim 15, wherein the isocyanate-reactive groups of chain extending agent are more reactive with isocyanate groups in water.

* * * * *